United States Patent Office 3,744,990
Patented July 10, 1973

3,744,990
PROCESS FOR THE BENEFICIATION OF WASTE COPPER SLAG BY REMOVAL AND RECOVERY OF ITS CONTENT OF COPPER AND ZINC
Harold W. Wilson, El Paso, Tex., assignor to Golden Cycle Corporation
No Drawing. Filed Oct. 14, 1970, Ser. No. 80,754
Int. Cl. C22b 7/04, 3/00, 15/10
U.S. Cl. 75—24         13 Claims

ABSTRACT OF THE DISCLOSURE

A process for beneficiation of waste copper slag to be used for the entrapment of sulfur dioxide from waste gases by contacting the waste slag with an aqueous solution of ammonia gas to remove the reactive copper content, and zinc content, if any present in the waste slag. The removal of the copper by the aqueous ammonia solution is accomplished without the presence of any dissolved ammonium salts or the addition of air or other oxidizing agent to the reaction. After dissolving the copper values and zinc values, if desired, they may be recovered from the ammonia gas solution by displacement.

---

In my earlier co-pending applications for patent, Ser. No. 694,848, filed Jan. 2, 1968, and Ser. No. 885,612, filed Dec. 16, 1969, I have disclosed processes whereby sulfur dioxide contained in waste gases resulting from smelting of sulfur-containing copper ores can be chemically and physically entrapped by the use of water-wetted pulverized waste copper slags obtained as waste residues from reverberatory refining of copper pyritic type ores. These processes propose not only stripping of the sulfur dioxide gas from the waste gases in a manner that allows the recovery of the entrapped gas, but also repeated usage of the residual slag obtained after each recovery of the sulfur dioxide gas content.

After lengthy studies of the entrapment of sulfur dioxide gas by waste copper slags obtained from reverberatory refining of copper pyritic type ores in accordance with the processes described in my aforementioned applications, I have found that an undesirable formation of sulfate sulfur occurs during the sulfur dioxide entrapment causing oxidation of ferrous iron in the slag system to ferric iron. The presence of sulfate sulfur ion ($SO_4^{-2}$) and ferric ion ($Fe^{+3}$) in the system seriously detracts from the effectiveness of the waste slag to entrap the sulfur dioxide. Moreover, with reuse of these slags an excessive build-up of the sulfate sulfur and ferric ions occurs in the system to the point that the slag is no longer usable for entrapping sulfur dioxide.

I have discovered that when the waste slag contains cupric copper ($Cu^{+2}$) in excess of 0.05 percent $Cu^{+2}$, an autoxidation of both alkali (and alkaline earth) sulfites and stannous tin ($Sn^{+2}$) apparently occurs as a result of a catalysis by the cupric copper ($Cu^{+2}$). With respect to the sulfite sulfur ($SO_3^{-2}$), this autoxidation is illustrated by the following:

(1)  $Cu^{+2}+SO_3^{-2}+H_2O \rightarrow Cu^++OH^-$
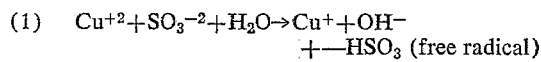

(2)  $SO_3^{-2}+O_2+H_2O+$—$HSO_3 \rightarrow 2SO_4^-$
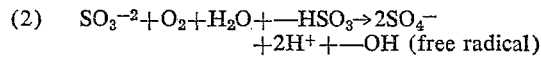

With the formation of a free hydroxyl radical (as shown in Equation 2 above) as well as some ionized sulfuric acid (as shown in Equation 1 above), a continued formation of acid sulfite free radical (—$HSO_3$) takes place according to the following representative reaction:

(3)  —$OH+SO_3^{-2}+H^+ \rightarrow OH^-$
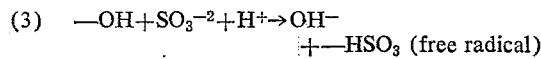

This chain of reactions continues to repeat itself, thereby resulting in a continual formation of unwanted sulfate sulfur ion ($SO_4^{-2}$), such as shown below:

(4)  $2Cu^{+2}+2OH^-+H_2SO_3+H_2O$
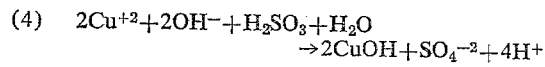

At the same time, the stannous tin ion ($Sn^{+2}$), which is introduced into the slag system for the primary purpose of inhibiting oxidation of the ferrous iron ($Fe^{+2}$) to ferric iron ($Fe^{+3}$) (as described in aforesaid application Ser. No. 885,612), is catalytically oxidized to stannic tin ($Sn^{+4}$) by the cupric copper ($Cu^{+2}$). This oxidation of the stannous tin ion results in a greatly reduced, and in some cases to a near total loss of, anti-oxidant effectiveness of the stannous salt as illustrated in the following representative equation:

(5)  $2Cu^{+2}+Sn^{+2}+4NaOH$
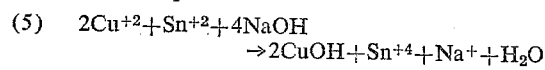

In the reverberatory refining of copper pyritic type ores, the loss of copper to the waste slag normally amounts to about one-fourth to four percent of the weight of copper charged to the furnaces. It is the incomplete separation of the copper mattes from the slags which is considered the major cause of the copper in waste slags. From chemical evaluations of a large number of samples of copper slags obtained from eight different sources in the United States, I have found contents of copper expressed as elemental copper (Cu) ranging from 0.27 percent to 3.89 percent Cu. Several samples obtained from three separate extremely large tonnage slag dumps (tonnages ranging between twenty and ninety million tons) analyzed for their total copper content showed averages of 0.47 percent, 0.59 percent, and 0.82 percent. This copper being present in the slags of this nature has been variously considered to be present as cupric oxide, copper silicates, metallic copper in solid solution, dissolved cuprous oxide, and trace amounts of dissolved and suspended copper sulfide.

My studies of slags indicate the copper to be present predominantly as cuprous and cupric oxides in the so-called "chilled" or "quenched" types while non-deoxidized elemental copper is present in higher proportions in the so-called "air cooled" types. In the various air cooled waste copper slags studied, only trace amounts of cupric oxide were found present, while studies of various quenched slags showed cupric copper contents as high as 0.22 percent. On the other hand, after samples of both the air cooled or quenched slags were exposed and then re-exposed to sulfur dioxide gas treatments in accordance with my procedures as disclosed in the aforementioned patent applications, their content of cupric copper was found to have increased to ranges of from 0.15 percent with the air cooled slags up to as high as 0.43 percent with some quenched slags. The higher percentages of cupric copper were found in both type slags after they had been subjected to multiple recycling with sulfur dioxide gas treatment. Coincidental with the increased content of cupric copper, increased amounts of both ferric iron and sulfate sulfur were likewise found after multiple recycling of the slags in the sulfur dioxide gas entrapment processes.

Accordingly, I have discovered that the usable life of waste copper slags for the entrapment of sulfur dioxide from waste stack gases can be significantly prolonged by first processing the slags to remove the "reactable" copper and copper compounds contained therein prior to exposing such slags to sulfur dioxide gas entrapment processes. In addition, the copper, and zinc, values contained by such slags once removed can then be recovered in amounts, in most cases, which are more than sufficient in monetary value to greatly offset the costs involved in preparing (pulverization and handling) the waste slags to be used in the sulfur dioxide gas entrapment processes.

It is known in leaching native copper found in oxidized copper ore or from copper scrap and from certain kinds of copper ore tailings, or from metal present in the form of copper turnings and the like to expose such materials to strongly aerated (oxygenated) solutions of aqueous ammonia ($NH_4OH$) containing dissolved ammonium salts, usually ammonium carbonate $(NH_4)_2CO_3$ because of its ready volatilizability. On the other hand, it has not previously been demonstrated that leaching of copper values might be accomplished in the absence of oxygen or an oxidizing agent. Even hot concentrated solutions of ammonia gas dissolved in water (ammonium hydroxide—$NH_4OH$) dissolve only very small quantities at most of non-deoxidized elemental copper even after prolonged exposure.

In contrast, I have discovered that the reactable copper and zinc, in their various chemical states and combinations, present in pulverized waste copper slags readily react directly with and are dissolved by aqueous solutions of ammonia gas ($NH_4OH$) alone, without the presence of any ammonium salts or oxidizing or acidifying agents. The resultant solutions of copper and zinc amine complexes thus formed can then be simply separated mechanically from the insoluble, solid beneficiated slag residue and readily processed to permit recovery of their contents of copper and zinc.

Accordingly, the principal object of this invention is to obtain a beneficiated waste copper slag which is more efficient and has a prolonged useful life for entrapping sulfur dioxide gas contained in waste stack gases in accordance with the processes disclosed in my prior co-pending applications for patent, Ser. Nos. 694,848 and 885,612, filed Jan. 2, 1968 and Dec. 16, 1969, respectively.

The other principal object of this invention is to remove from waste copper slags the reactable copper values, and zinc values if present, by directly contacting the pulverized slag with aqueous ammonia solution without the addition of an ammonium salt, acid, or air or other oxygen source.

A further object of the invention is to recover the copper values and zinc values, if any, from waste copper slags by removing these metal values from the aqueous ammonia solution.

A still further object resides in the economics of carrying out my sulfur dioxide entrapment processes with beneficiated waste copper slags after the copper values and zinc values, if any, have been recovered therefrom.

These and other objects are obtained by directly treating waste copper slag obtained from the reverberatory refining of copper pyritic type ores with an aqueous solution of ammonia gas or ammonium hydroxide in sufficient quantity to dissolve the reactable copper values contained in the slag. The term "reactable" copper as used in this specification means the quantity of copper values present in the waste slag as both elemental copper and copper compounds which will react with and be solubilized by an excess of either an aqueous solution of ammonia gas or sulfur dioxide gas.

The aqueous solution of ammonia gas, or ammonium hydroxide, containing the leached reactable copper values is then mechanically separated from the slag. The slag residue, after being washed with a very dilute solution of ammonia gas to remove all dissolved copper values, is thus beneficiated by removal of the copper values and contains approximately 5–10% water by weight. It is therefore ready for immediate exposure, if desired, to waste stack gases containing sulfur dioxide gas in accordance with my sulfur dioxide entrapment processes.

The copper enriched aqueous solution of ammonia gas can then be treated with a metal which is capable of displacing the copper in solution and precipitating copper in its elemental form. For reasons which are discussed hereinafter, I prefer the use of metallic zinc (Zn). After the copper has been reduced to its elemental form, it is mechanically removed from the solution. The aqueous solution still having a content of ammonia gas makes it suitable for re-use over and over again for processing additional quantities of unprocessed waste copper slag after each copper removal step. Occasionally, the aqueous solution, freed of its copper content, will need replenishment of the ammonia gas to assure a content of ammonia gas sufficient to meet the ammonia demands of both the copper solvation and the copper removal cycles.

In attempting to understand the solvation of the copper entities present in waste copper slags by the use of aqueous ammonia gas solutions, I theorize that the leaching is possible primarily because of the presence in such slags of a combination of mixed metal silicates, including zinc silicate, and cuprous oxide. As such, the initial reaction of the copper and zinc compounds when exposed to the aqueous ammonia gas solution presumably results in the formation of metal ammines which themselves become secondary reactants in their own right capable of effecting additional dissolution of the undissolved copper present in the slag in elemental form. This theory is illustrated in the following series of equations:

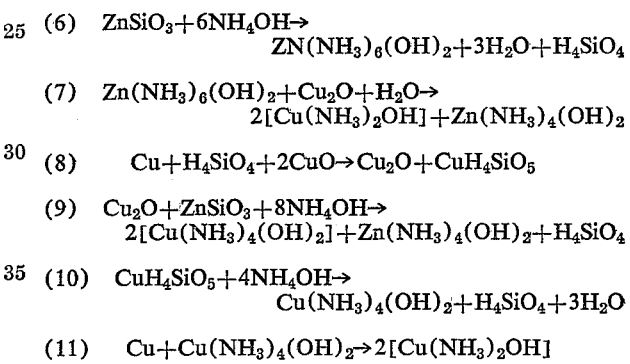

Furthermore, it is known that as a general rule of chemistry zinc displaces copper when introduced into copper salt solutions. However, in the solvation step of the instant process I have found that, regardless of the concentration of ammonia gas ($NH_3$) in the aqueous ammonia gas solution employed, when pure (deoxidized) elemental copper metal is brought into contact with an aqueous ammonia gas solution containing some dissolved zinc silicate, both the rate of dissolution and the amount of such metallic copper dissolved is greatly increased over that obtained with the same ammonia concentration solution but without any zinc silicate content. This phenomena is apparently the result of the following theory. When powdered zinc metal is added to aqueous orthosilicic acid solutions ($H_4SiO_4$), nascent hydrogen is liberated:

(12)    $Zn + H_4SiO_4 \rightarrow ZnSiO_3 + H_2O + 2[H]$ and orthosilicic acid reacts with ammonia,

(13) $H_4SiO_4 + 4NH_4OH \rightarrow (NH_4)_4SiO_4 \cdot 4H_2O$
$\rightleftharpoons (NH_3)_4H_4SiO_4 + 4H_2O$ and zinc silicate reacts with ammonia,

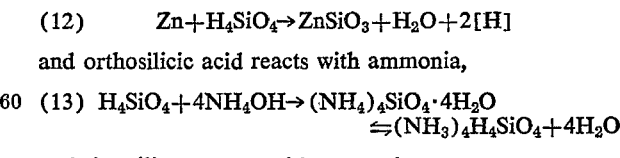

Thus, when pure elemental copper is contacted by the zinc ammine silicate (of Equation 14 above) rearrangement and reconstitution of the zinc ammine silicate apparently takes place with the elemental copper being oxidized to cupric tetrammine hydroxide as evidenced by a rapid ever-increasing development of blue color characteristic of the high valent copper ammine. This rearrangement, reconstitution, and oxidation of the elemental copper is believed to occur solely as a result of copper catalysis causing formation of free hydroxyl radicals (—OH)

coincidental with liberation of nascent oxygen [O] as shown in the following equations:

(15)
$$SiO_3^{-2} + H_2O \xrightarrow[\text{catalyst}]{Cu} H_4SiO_4 + (OH) \text{ free radical}$$

(16) $4(-OH) + 2[Zn(NH_3)_4H_4SiO_5] \rightarrow 2[Zn(NH_3)_4(OH)_2] + 2H_4SiO_4 + 2[O]$

(17) $2[O] + 2Cu + 8NH_4OH \rightarrow 2[Cu(NH_3)_4(OH)_2] + 6H_2O$

Hence, in those instances where some waste copper slags lack a zinc silicate content or a content of ammonium hydroxide reactable zinc, thereby making dissolution of the copper of such slags more difficult, it is desirable to add small amounts of zinc silicate or zinc hydroxide in the order of 0.1 to 0.5 percent equivalent zinc (based on the weight of slag to be processed) to effectively aid in promoting a more rapid dissolution of the copper by the aqueous ammonia gas solution.

However, as pointed out previously, it is convenient to reuse as the ammonia gas solution that which has previously been used, but after the dissolved copper content has been replaced by a more electropositive metal. Therefore, when zinc metal is used to displace the copper values in the ammonia gas solution, its presence in solution should avoid the necessity to add additional zinc compounds even if the waste slag does not contain any appreciable content of zinc silicate.

Furthermore, since the metal ammine complexes of both the copper and zinc enhance the dissolution of elemental copper, it is unnecessary to have a total reduction of the copper take place from the copper-enriched ammonia gas solution when it is to be repeatedly reused.

To further emphasize the significance of my copper solvation process over prior techniques for copper leaching, my experiments showed aqueous ammonia gas solutions to be superior copper dissolving agents for dissolving the copper of waste slags than were aqueous solutions of ammonium carbonate—$(NH_4)_2CO_3$. Experiments showed that by using aqueous ammonia gas solutions solely, 75 percent more of the reactable copper present in these slags was dissolved during the same length of time of exposure under like conditions of slag composition and particle size than was dissolved by using equivalent aqueous solutions of ammonium carbonate. As a result of these, plus additional studies I have found that the use of aqueous ammonia gas solutions is superior to the use of aqueous solutions of ammonium carbonate for dissolving the reactable copper in waste copper slags even though prior teachings define aqueous solutions of ammonium carbonate as the preferred dissolving agent for elemental copper per se.

As stated previously, the primary purpose of beneficiating waste copper slags is to obtain slag products that are better suited chemically for multiple re-use in my sulfur dioxide gas entrapment processes by the removal of the reactable copper. Studies have shown that the more finely divided the slag, the greater is the amount of copper dissolved by use of aqueous ammonia solutions. For example, a waste copper slag having a total copper content of 0.78 percent expressed as Cu, which is pulverized to a particle size in the range of 0.10 mm. to 0.15 mm. and then exposed to an aqueous ammonia gas solution containing 10 percent $NH_3$ by weight, resulted in dissolving 61 percent of the total copper content contained by the slag. Under identical conditions but using the same slag pulverized to a fineness where 100 percent of its particles were smaller than 0.10 mm., approximately 82 percent of the total copper content was dissolved.

On the other hand, additional studies revealed that, regardless of the degree of fineness of the slag particles treated with aqueous ammonia gas solutions, only trace amounts at most of copper undissolved by such ammonia gas solutions were subsequently dissolved when identical amounts of the same slag composition, previously processed for removal of reactable copper, was exposed to sulfur dioxide gas treatment. Thus, the term "reactable" copper has been employed herein to define the copper and copper compounds present in waste copper slags that are reactable with, i.e. solubilized by, either aqueous ammonia gas solutions or aqueous sulfur dioxide gas solutions.

Furthermore, it was found that copper removal from the waste slag increased the efficiency of the sulfur dioxide gas entrapment. In particular, studies showed that processed (for copper removal) versus non-processed slags were capable of reacting initially with greater amounts of sulfur dioxide gas. For example, using samples of both air cooled and quenched pulverized slags with exposure to simulated waste gas containing approximately one percent sulfur dioxide gas (by vol.), both the air cooled and the quenched slags, which have been processed first for removal of their contents of reactable copper, reacted with five to seven percent more sulfur dioxide gas than did the same kinds and types of slags which had not been processed for removal of reactable copper contents, when all other conditions during the studies were maintained as nearly identical as was possible.

Chemical evaluations were made of various kinds and types of waste copper slags from several sources treated by my proposed process for removal of the reactable copper content, and samples of both the treated and non-treated slag were exposed to identical continual cyclical processing with sulfur dioxide gas. Each slag showed without exception that the beneficiated form (processed for copper removal) suffered only very slight increases in ferric iron and sulfate sulfur formation while the non-beneficiated form (not processed for copper removal) suffered ever-increasing formation of large amounts of both ferric iron and sulfate sulfur with each additional cycling in my sulfur dioxide gas entrapment processes.

In the use of this process, after isolation of the metal ammine solution from the insoluble (beneficiated) slags it is not necessary to remove the last vestiges of ammonia gas from the separated wet slag since the presence of residual ammonia in no way impairs the use of the slag in my previously described sulfur dioxide gas entrapment processes. Any ammonia, if present, will react to form ammonium sulfite.

In displacing the copper values from the enriched copper ammine solutions, a powdered or granulated zinc metal would promote a more rapid reduction of the copper (as a result of the increased surface area afforded by finely divided zinc metal). However, it is preferred to use sheet, ribbon, rod, or other semi-massive form of zinc metal so that it is possible to readily remove mechanically the entire unreacted portion of such zinc metal from the ammine solution under processing at any desired instant. This permits not only controllable reduction of the copper to the point at which the solutions can be made to contain the desired residuals of unreacted copper ammine complexes (amounts of unreacted copper ammine complex residuals as desired for re-use of the solutions having enhanced copper dissolving capabilities as a result of their contents of such copper ammine complexes) but, equally important, systems will become possible wherein the copper which has been reduced to metal (elemental) form will not be overtly contaminated with finely divided zinc metal, nor will the resultant solutions contain hydrogen in excess of the amount required to effect the degree of reduction wanted.

Increased temperatures above ambient during reduction of the copper from the metal ammine solutions will increase the rate of reduction by accelerating the formation of nascent hydrogen. However, it is neither necessary nor desirable to heat the solutions since excessive heating will cause undesirable loss of ammonia gas from solution and may promote formation of amounts of hydrogen in excess of the actual requirements for optimum reduction.

The presence of residual hydrogen in the aqueous ammonia gas solutions to be re-used to treat previously untreated waste copper slags is not detrimental. Trace amounts of hydrogen will assist in minimizing hydrolytic autoxidation of the ferrous iron (FeO) and at the same time will also act to reduce ferric iron that appears to be invariably present to at least some small degree in all waste copper slags.

Although the zinc, dissolved, both from the slag (by its having been processed by the aqueous ammonia gas solutions) as well as the elemental zinc used in the copper reduction step can be removed if desired after each singular use of the aqueous ammonia gas solutions, it is neither necessary nor desirable to do so. As explained previously, zinc ammines and zinc silicates both present in systems under the conditions of my proposed process enhance the dissolution of the copper metal. Thus, removal of the zinc from solutions which have been processed for copper removal by zinc reduction is preferably delayed as long as possible, or until such time as continued (multiple) re-use of the solutions have resulted in a build-up of dissolved zinc such that excessive amounts of dissolved ammonia gas would be required both to effect copper dissolution and to keep the dissolved copper and previously dissolved zinc in solution as soluble copper and zinc ammine complexes.

With variations in the amounts of copper and zinc present in various source waste copper slags, varied amounts of elemental zinc will be required for processing the various copper-enriched ammine solutions. This will result in variations of the soluble zinc accumulations in the various copper-freed ammine solutions, and the number of re-use cycles of such solutions also affects the zinc build-up. Therefore, in order to determine the maximum number of times any single aqueous ammonia gas solution having a specified content of ammonia gas can be repeatedly employed for dissolution and recovery of the reactable copper (and zinc) content contained in any particular slag, the copper and zinc content of the concerned slag should be predetermined. This can conveniently be accomplished by exposing such slag to small scale laboratory processing studies to determine optimum amounts of known ammonia gas content solutions required to effect the desired degree of dissolution of the previously determined copper and zinc present in the particular slag and the elemental zinc requirements to effect the degree of copper reduction desired in the mixed metal ammine solutions isolated from the processed slag.

When processing reaches the stage (as previously discussed) when it becomes necessary to remove the zinc, present in solution as zinc ammine, it is first desirable to remove the entire copper content of the ammine solution by the zinc metal reduction step. Then, it is only necessary to heat-digest the solution to cause liberation of volatile ammonia gas (which is collected in combination with vaporized water by condensing and retaining for re-use in additional slag processing) and to cause precipitation of impure zinc hydroxide—$Zn(OH)_2$, such as shown in representative Equation 18 below:

(18) 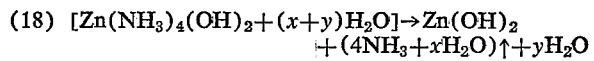
$$[Zn(NH_3)_4(OH)_2 + (x+y)H_2O] \rightarrow Zn(OH)_2 + (4NH_3 + xH_2O)\uparrow + yH_2O$$

($x$ always represents a small fraction of $y$).

Without limiting the scope of the invention, I hereinafter set forth an example of my proposed process for the beneficiation of waste copper slag by removal and recovery of its content of reactable copper:

A 200 gram lot of air cooled waste copper slag known by prior chemical analysis to contain 0.37 percent total copper (expressed as Cu) which had previously been pulverized to a particle size ranging from about 0.10 mm. to 0.15 mm., was placed in a closable container with 200 mls. of aqueous ammonia gas solution having an ammonia gas content of 10 percent $NH_3$ by weight. The container with contents was sealed in such a manner as to completely exclude contact with the atmosphere and to prevent any loss of contents when the container was subjected to vigorous mechanical shaking for a time period of one hour. Thereafter, the container was unsealed and the blue colored liquid metal ammine solution was isolated from the insoluble solid material by filtration. The insoluble solid material was washed on the filter with two 25 ml. portions of an aqueous ammonia gas solution containing approximately 0.5 percent $NH_3$ by weight. The isolated solid residue was reserved for studies to be described below.

A piece of pure zinc ribbon of dimensions approximating a width of one-half inch, a thickness of 0.01 inch, and a length of six inches was placed in the isolated metal ammine solution which was allowed to stand at ambient temperature. When the solution was devoid of its blue color, the unreacted portion of zinc ribbon was removed, washed with water and reserved for future use. The solid, insoluble copper metal was isolated from the ammonia gas solution by decantation of the solution which was reserved for re-use. The thus isolated copper metal was washed free of contaminating solution with water after which it was dried, weighed, and analyzed for percent copper content. Application of the above-described processing resulted in obtaining 0.5052 gram of copper metal having a purity of 99.61 percent equivalent to 0.5032 gram of 100 percent pure copper representing 68.1 percent of the total copper content of the slag prior to processing.

A representative portion of the original (but unprocessed) pulverized slag and a like representative portion of the beneficiated slag (insoluble solid material obtained as described above and reserved for studies) was then subjected to treatment with sulfurous acid solution (approximately 1 percent $SO_2$ content by weight). It was found that 47.3 percent of the total copper contained by the original slag (unprocessed for copper removal) was dissolved by use of the noted sulfurous acid solution in contrast to the 68.1 percent dissolved by use of the 10 percent ammonia gas solution while less than 0.01 percent copper was found present in the solution obtained from treating the beneficiated slag (obtained by above procedure) using the same amount of the same sulfur dioxide gas concentration sulfurous acid solution. This result indicates that waste copper slags are indeed beneficiated by first processing them with aqueous ammonia gas solutions since more of the total copper present is acted upon by the ammonia solution than by the sulfur dioxide solution and essentially no copper is reactable when exposed to a sulfur dioxide gas solution after having been initially processed with an ammonia gas solution.

While I have endeavored to explain hereinabove the various reactions which take place in my disclosed invented process it is to be understood that the explanation is presented solely for the purpose of assisting in understanding the invention and the chemical reactions which are believed to take place. Accordingly, it is not intended that the invention be limited to the specific theory described hereinbefore, nor is it intended that the invention depend upon the occurrence of any or all of the specific reactions stated.

Furthermore, it will appear to those skilled in the art that minor modifications may be made in the process described without in any way departing from the spirit and scope of the invention. Accordingly, it is intended and understood that the invention will not be limited to the exact details disclosed hereinbefore, but will be defined in accordance with the appended claims.

What is claimed is:

1. A method for directly recovering copper from previously unacidified and unoxidized waste copper slag derived from the reverberatory refining of pyritic type copper ores which comprises:
 (a) contacting said slag with a solution of ammonia gas in water to dissolve any reactable copper values present therein;

(b) removing said solute containing said dissolved copper values;

(c) displacing said dissolved copper values from said solute with a metal more electro-positive than copper; and (d) recovering the elemental copper thus displaced from the solute.

2. A method according to claim 1, wherein the more electro-positive metal is aluminum.

3. A method according to claim 2, wherein the more electro-positive metal is zinc.

4. A method according to claim 3, wherein the procesing steps are repeated until the zinc concentration formed by the displacement of the copper in the solute becomes excessive at which time the solute is heated to recover the zinc.

5. A method according to claim 1 wherein said displacement with a metal more electro-positive than copper comprises contacting said solute with a semi-massive form of said metal.

6. A method according to claim 1 wherein said solution of ammonia gas in water contains about 10% by weight ammonia gas.

7. A method according to claim 1 wherein said slag is contacted with said solution of ammonia gas in water in the presence of zinc values.

8. A method according to claim 7 wherein said zinc values are contained in said slag.

9. A method according to claim 7 wherein said zinc values are added to said slag-solution of ammonia gas in water system by addition of 0.1 to 0.5% based on the weight of said slag of a zinc compound selected from the group consisting of zinc silicate and zinc hydroxide.

10. A method according to claim 7 wherein the more electropositive metal is selected from the group consisting of zinc and aluminum.

11. A method according to claim 10 wherein the more electropositive metal is zinc.

12. A method according to claim 10 wherein said solution of ammonia gas in water contains about 10% by weight ammonia gas.

13. A method according to claim 1 wherein said displacement with a metal more electro-positive than copper comprises contacting said solute with a ribbon of said metal.

References Cited

UNITED STATES PATENTS

| | | | |
|---|---|---|---|
| 3,273,997 | 9/1966 | Wilson | 75—24 |
| 3,288,597 | 11/1966 | Wilson | 75—117 |
| 2,923,618 | 2/1960 | Redemann | 75—117 |
| 2,647,829 | 8/1953 | McGauley | 75—117 |
| 2,805,918 | 9/1957 | Hare | 75—117 |
| 3,523,787 | 8/1970 | Ullrich | 75—103 |

OTHER REFERENCES

J. Newton, Extractive Metallurgy, p. 421 (1967).

Mellor, Comprehensive Treatise on Inorganic & Theoretical Chemistry, vol. 3, pp. 14–17 (1922).

L. DEWAYNE RUTLEDGE, Primary Examiner

P. D. ROSENBERG, Assistant Examiner

U.S. Cl. X.R.

75—103, 117